United States Patent

[11] 3,583,239

| [72] | Inventors | T. O. Paine<br>Administrator of the National Aeronautics and Space Adminiastration with respect to an invention of;<br>John G. Campbell, Los Angeles, Calif. |
|---|---|---|
| [21] | Appl. No. | 865,329 |
| [22] | Filed | Oct. 10, 1969 |
| [45] | Patented | June 8, 1971 |

[54] TUBE SEALING DEVICE
1 Claim, 3 Drawing Figs.

[52] U.S. Cl. .................................................. 73/49.8
[51] Int. Cl. ..................................................... G01m 3/04
[50] Field of Search ................................... 73/49.8, 37, 40, 40.5, 49.1, 49.5; 138/90

[56] References Cited
UNITED STATES PATENTS
1,221,733  4/1917  Henderson ................. 73/49.8X

| 3,503,249 | 3/1970 | Dumond..................... | 73/49.1 |
|---|---|---|---|
| FOREIGN PATENTS | | | |
| 61,634 | 5/1968 | Germany..................... | 73/49.1 |
| 66,959 | 5/1969 | Germany..................... | 73/49.1 |

Primary Examiner—Louis R. Prince
Assistant Examiner—William A. Henry, II
Attorneys—G. T. McCoy, J. H. Warden and Monte F. Mott ABSTRACT: A tube sealing device particularly suited for use in sealing the opposite ends of tubular bodies during material testing operations, characterized by an elongated body having enlarged, rigidly interconnected cylindrical portions located at its opposite ends and adapted to be inserted and confined within a tubular body for defining between the end portions an hermetically sealed constant-volume chamber. A feature of the invention being the provision of a device adapted to confine fluid under pressure within a tubular body while obviating an application of axially directed end loads to the wall of the body.

PATENTED JUN 8 1971 3,583,239
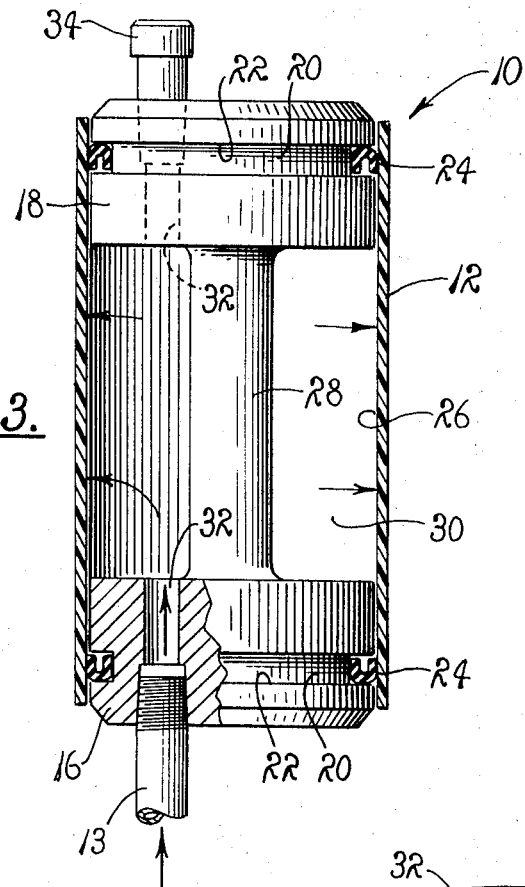
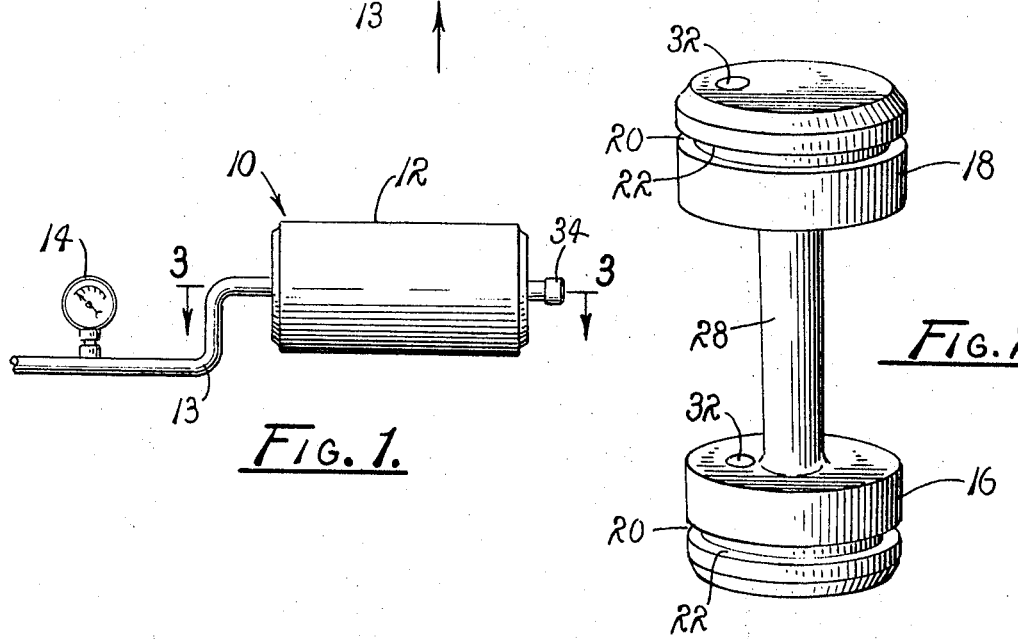
Fig.3.
Fig.1.
Fig.2.
JOHN G. CAMPBELL
INVENTOR
ATTORNEYS 3,583,239

1

TUBE SEALING DEVICE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to a tube sealing device and more particularly to an improved sealing device for use in hermetically sealing the ends of tubular bodies for establishing an hermetically sealed, constant-volume chamber therewithin.

2. Description of the Prior Art

Tube sealing devices of the type heretofore employed in sealing a tubular body for establishing an hermetically sealed chamber therewithin normally require coupling means which serve to couple end closures to the cylindrical wall of the body being sealed. By way of example, tubes frequently are sealed by "capping" of the ends thereof by fixedly securing end plates to the tube's wall or by placing resilient, stopperlike closure devices within the ends of the tubes.

In instances where a tube, or a body having a wall of a tubular configuration is tested for structural integrity, through an introduction of fluids under pressure, sealing devices fixedly coupled with the wall of the tube serve to apply end loads to the wall as pressures are developed therewithin. In many instances such loads preferably are avoided, particularly where tests of material are being conducted for purposes of determining the effects of radially directed forces. Furthermore, where a resilient body is employed as a closure member, the radially directed forces developed by the resilient body must be sufficient to insure its retention. Consequently, the additive effect thereof may become significant and undesired when combined with the effect of radially directed forces developed within the sealed chamber. Additionally, the cold-flow characteristics of resilient closure devices render the use of such devices undesirable, particularly where a constant-volume, constant-pressure chamber is desired.

Therefore, there has heretofore existed a need for a simplified tube sealing device capable of being employed for establishing a pressure chamber within a tube, while obviating a structural coupling thereof with the wall of the tube being sealed.

OBJECTS AND SUMMARY OF THE INVENTION

The present invention provides an improved and simplified tube sealing device of a "dumbbell" configuration which satisfies many of the existing needs through the use of a pair of rigid, cylindrical sealing members interconnected by a rigid, coaxially aligned body which maintains a predetermined spacing between the sealing members so that the device may be inserted and hermetically sealed within a tube for establishing therein an hermetically sealed chamber adapted for pressurization through convenient openings provided within the sealing member.

Accordingly, an object of the instant invention is to provide an improved tube sealing device.

Another object of the invention is to provide an improved tube sealing device for use in hermetically sealing the ends of a tubular body in a manner such that axially directed forces applied to the sealing device are not transmitted to the wall of the body.

Another object is to provide an improved tube sealing device having particular utility in material testing operations, wherein a tube formed of materials to be tested is subjected to pressure tests through an introduction of pressurized fluids to sealed chambers established within the tube.

Another object is to provide a tube sealing device which is readily operable for establishing an hermetically sealed, constant-volume chamber within a tube.

2

These together with other objects and advantages of the present invention will subsequently become more clearly apparent upon reference to the following description in the specification and accompanying drawing.

BRIEF DESCRIPTION OF THE DRAWING

FIG. 1 is a diagrammatic view illustrating an operative environment of the tube sealing device embodying the principles of the present invention.

FIG. 2 is a perspective view of the tube sealing device.

FIG. 3 is a section taken generally on line 3-3 of FIG. 1.

DESCRIPTION OF THE PREFERRED EMBODIMENT

Turning now to FIG. 1, a device 10 embodying the principles of the present invention is illustrated in an operative environment wherein the device is seated within a tube 12 and coupled with a pressure system, including a conduit 13, adapted to deliver fluid under pressure for purposes of subjecting the tube to selected internal pressures. Normally, such pressures are detected through the use of a pressure measuring device 14. Such devices are well known and form no part of the instant invention, therefore a detailed description of the pressure measuring device 14 is omitted.

Turning now to FIG. 2, the device 10 is of a "dumbbell" configuration in that it includes a pair of cylindrical sealing members 16 and 18 which, in practice, serve to establish an hermetically sealed chamber within the tube 12. The sealing members 16 and 18 are provided with an outside diameter approximating the inside diameter of the tube within which a sealed chamber is to be established. In practice, the end portions 16 and 18 are fabricated from any suitable nonporous material which resists strain at anticipated operating pressures. Since various types of metals are currently available, such as stainless steel, for example, it is to be understood that the material from which the dumbbell is fabricated is a matter of convenience dictated by the operative pressure to be encountered within the resulting chamber.

About the surface of each of the portions 16 and 18 there is formed a groove 20 having opposed shoulders 22 adapted to retain therebetween a resilient sealing ring 24. During operation, the ring 24 is forced into sealing engagement with adjacent surfaces 26 of the wall of the tube 12.

The sealing ring 24 is of any suitable configuration capable of establishing an hermetic seal between the surface 26 of the tubular member 12 and the external surface of the portions 16 and 18 of the body 10. In practice, the ring 24 is formed of neoprene, or similar flexible material, and can, if desired, assume an O-ring configuration and may even be pneumatically or hydraulically inflatable for establishing a seal, if desired. However, as presently employed, the ring 24 is provided with a U-shaped cross section configuration which outwardly is expanded in response to pressure developed within the tube.

In order that the portions 16 and 18 may be maintained at a preselected distance, they are interconnected through a rigid, barlike connector 28 disposed in a coaxial disposition relative to the end portions. If desired, the connector 28 may be formed as an integral part of the portions 16 and 18. In any event, the outside diameter of the connector is significantly less than the outside diameter of the portions 16 and 18.

When the device is inserted into the annulus of a tube there is established about the connector 28 a chamber 30, of a substantially toroidal configuration into which may be introduced fluids under pressure.

In practice, each of the portions 16 and 18 is drilled to provide a fluid conduit 32 extended to communicate with the chamber 30. As a practical matter, one of the conduits 32 is coupled within the pressure system while the opposite conduit is sealed through a suitable sealing plug 34. Hence, as fluid under pressure is introduced into the chamber 30, forces acting radially against the internal surfaces of the tubular member 12 are developed therewithin. However, axially directed forces developed within the tube are opposed by the opposite end portions acting in mutual opposition through the connector 28. Consequently, the pressures developed within the tube serve to develop and apply to the wall radially directed forces without applying to the wall axially directed forces.

Normally, it is preferred that the cylindrical portions 16 and 18 be disposed near the opposite ends of a tube being sealed, particularly where the tube is being subjected to a pressure test, in order to distribute the resulting forces as they are developed throughout the tube. However, it should be appreciated that the end portions of the device 10 may be successively repositioned along the tube for pressurizing the tube at successive locations along its internal surface.

OPERATION

It is believed that in view of the foregoing description, the operation of the device will be readily understood, however, it will be briefly reviewed at this point. With the device 10 having a ring 24 seated within the groove 20 of each of the cylindrical end portions 16 and 18, and with one of the conduits 32 being connected with the conduit 13 and the other conduit 32 sealed through the use of a convenient plug 34, the device 10 is inserted within a tube having an inside diameter approximating the device's outside diameter in order that a pressure chamber 30 be established between the portions 16 and 18. Fluid under pressure then is directed by the conduit 13 through the conduit 32 into the chamber 30. Due to an hermetic sealing of the chamber 30, by the rings 24, pressure is developed within the tube 12, and radially is applied against the tube's internal surface 26. However, since the device 10 is slidingly received within the tube 12 and since the connector 28 maintains the end portions 16 and 18 of the device 10 at a predetermined spacing, all forces acting against one of the end portions of the device are opposed by equal forces acting against the other end portion, through the connector 28 in order that a static condition is imposed on the device. Therefore, it should readily be apparent that, in operation, forces developed within the chamber 30 are applied in radial directions along the surface 26, while the axially directed forces developed within the chamber can act only against the opposite end portions of the device 10.

In view of the foregoing, it should be readily apparent that the device of the instant invention provides a simple solution to the problem of establishing hermetic seals at the opposite ends of chambers defined in tubes without requiring a coupling of end closures thereto in order that an application of axially directed load forces may be effectively obviated.

Although the invention has been herein shown and described in what is conceived to be the most practical and preferred embodiment, it is recognized that departures may be made therefrom within the scope of the invention.

What I claimed is:

1. A tube sealing device particularly suited for use in simultaneously sealing opposite ends of a tubular body for establishing therewithin an hermetically sealed, constant-volume chamber comprising:

A. a pair of axially spaced, coaxially related cylindrical members, each being of a unitary configuration and having a diameter, approximating the internal diameter of the tubular body, received within said body and establishing therebetween said constant-volume chamber;

B. rigid coupling means including an elongated bar coaxially related to each member of said pair of members and interposed therebetween rigidly coupling the members into a fixed mutual relationship, whereby axially directed forces developed within said chamber oppositely are applied to said bar through said members for thus isolating the body from said axially directed forces;

C. a tubular conduit abaxially extended through one of said members for delivering fluid under pressure to said chamber for this establishing within the chamber an increased pressure, whereby both axially and radially directed forces simultaneously are developed therewithin;

D. means defining a peripheral groove circumscribing each member of said pair of members;

E. a pressure-responsive seal of an annular configuration seated in each of said grooves and expandable in response to increased pressures developed within said chamber for establishing about each of said members an hermetic seal whereby said chamber is caused to be hermetically sealed; and F. said seal having a cross section of an inwardly opening, shaped configuration.